(12) United States Patent
Neal, Jr. et al.

(10) Patent No.: US 6,673,203 B1
(45) Date of Patent: Jan. 6, 2004

(54) SOFT LOW LINT TISSUE

(75) Inventors: Thomas Garrett Neal, Jr., Appleton, WI (US); Charles Herbert Goerg, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 33 days.

(21) Appl. No.: 10/138,666

(22) Filed: May 2, 2002

(51) Int. Cl.[7] ............................................... D21H 27/40
(52) U.S. Cl. ...................... 162/112; 162/125; 162/127; 162/129; 162/158
(58) Field of Search .................. 162/123, 125, 162/129, 127, 158; 428/154

(56) References Cited

U.S. PATENT DOCUMENTS

| | | |
|---|---|---|
| 3,994,771 A | 11/1976 | Morgan, Jr. et al. |
| 4,326,000 A | 4/1982 | Roberts, Jr. |
| 5,494,554 A | 2/1996 | Edwards et al. |
| 5,730,839 A | 3/1998 | Wendt et al. |
| 5,981,044 A * | 11/1999 | Phan et al. ............... 162/129 |
| 2002/0112834 A1 | 8/2002 | Shannon et al. |

FOREIGN PATENT DOCUMENTS

| | | |
|---|---|---|
| WO | WO 95/01478 A1 | 1/1995 |
| WO | WO 00/77303 A1 | 12/2000 |

* cited by examiner

*Primary Examiner*—Peter Chin
(74) *Attorney, Agent, or Firm*—Gregory E. Croft

(57) ABSTRACT

A multi-ply tissue product is described in which the two outer plies are layered such that the inwardly-facing layer of each outer ply contains a chemical debonder to impart softness while confining lint and slough from that layer to the inside of the tissue product.

17 Claims, No Drawings

SOFT LOW LINT TISSUE

BACKGROUND OF THE INVENTION

In the manufacture of tissue products, such as facial tissue, bath tissue, paper towels and napkins, it is known to place debonders in the tissue in order to soften the feel of the tissue. Although increasing the soft feel of the tissue is advantageous, the use of debonders also tends to increase the amount of lint and slough, which is undesirable to consumers. As used herein, "lint" is clinging bits and/or fine particles of fiber or fiber-like material not firmly bonded to the tissue that are easily released during dispensing or tissue handling. "Slough" is fibers, fiber debris, and fiber clumps that are left on the skin during tissue use.

Therefore, there is a need to provide a tissue sheet that not only feels soft, but also exhibits less lint and slough in use than other tissues of comparable softness.

SUMMARY OF THE INVENTION

It has now been discovered that lint and slough can be reduced, while maintaining softness, by providing a multi-ply tissue with plies having a particular layered structure. More specifically, and contrary to conventional wisdom in the art, a chemical debonder is intentionally added to the inwardly-facing layer of each of the two outer plies. Since chemically debonded layers are the primary source of lint and slough, this layering configuration traps the lint and slough in the middle of the multi-ply product, while the soft inwardly-facing layer still contributes to the overall softness. Focusing on each of the two outer plies of a two-ply or three-ply product, for example, going from the outside of the product toward the center of the product, the layered structure of the two outer plies of this invention is conceptually "soft/strong/soft". In comparison, the layered structure using conventional layering approach is either "soft/soft/strong" or "soft/strong/strong". In both conventional structures, the innermost layer is a strength layer.

Hence, in one aspect the invention resides in a multi-ply tissue product comprising at least one, and particularly two, multi-layered creped outer plies of papermaking fibers, said multi-layered creped outer ply or plies having three or more layers which include a soft, outwardly-facing dryer-side layer, one or more inner strength layers and a soft, inwardly-facing air-side layer, wherein the inwardly-facing air-side layer comprises one or more chemical debonders.

In another aspect, the invention resides in a multi-ply tissue product comprising at least one, and particularly two, multi-layered creped outer plies of papermaking fibers, said multi-layered creped outer ply or plies having four or more layers which include a soft, outwardly-facing dryer-side layer, one or more inner strength layers and one or more inner air-side softness layers (hereinafter defined), wherein the inner air-side softness layer(s) comprises one or more chemical debonders. In this aspect, for a four-layer structure, it is desirable to have an untreated (no added debonder) air-side layer adjacent the inner air-side softness layer such that the basis weight of the air-side layer is less than the basis weight of the inner air-side softness layer. This puts a relatively thin untreated layer on the outside of the layered sheet that can aid in mechanical ply attachment.

These and other aspects of the invention will be further described below.

DETAILED DESCRIPTION OF THE INVENTION

As used herein, the "dryer-side layer" is the outside layer of a tissue sheet or ply that contacts the dryer surface during manufacturing, such as the Yankee dryer surface, when the layered tissue sheet is dried. This layer is most effectively debonded by creping for softness and bulk generation. It is within the scope of this invention to have debonder present in the dryer-side layer, either by intentional addition or by incidental addition during formation or due to the recycle of broke. However, it is particularly advantageous to provide the softening effect solely or substantially solely by creping in order to minimize the lint/slough that can be produced by the presence of chemical debonders. In such cases, the dryer-side layer will have no debonder present or substantially no debonder present (0.005 weight percent or less).

The "air-side layer" is the outside layer of a tissue sheet or ply that does not contact the dryer surface during manufacturing when the layered tissue sheet is dried. For purposes of this invention, this layer is chemically debonded for softness and bulk generation.

The "inner strength layer" is a layer positioned between the dryer-side layer and the air-side layer of a sheet or ply. There can be one, two, three or more inner layers. Of these one or more inner layers, at least one inner layer is a strength-providing layer. This strength-providing layer is relatively strong compared to the two soft outer layers and functions to provide the tensile strength needed to process the layered sheet through the tissue machine and the converting process. It also contributes significant strength to the finished product. The added strength can be imparted by fiber selection, refining and/or the addition of chemical strength agents.

The "inner air-side softness layer" is an inner layer that is closer to the air side of the sheet than it is to the dryer side of the sheet, separated from the dryer side of the sheet by at least one inner strength layer, and which contains one or more chemical debonders. A four-layer example of a sheet in accordance with this embodiment of the invention would have a layer structure as follows: dryer-side layer/inner strength layer/inner air-side softness layer/any layer. The last layer (any layer) could be a softness layer, an untreated layer, or a strength layer.

As used herein, "chemical strength agents" includes any chemical that increases the tensile strength of a tissue sheet. These chemicals include, without limitation, common dry strength agents and wet strength agents. By way of example, commercially available dry strength agents include Hercules Hercobond 1366, Cytec Parez 631 NC, and National Starch Redibond 5330A. Commercially available wet strength agents include Hercules Kymene 6500 and Kymene 557H.

As used herein, "chemical debonders" are any chemical that diminishes the capability of papermaking fibers to Hydrogen bond together, thereby reducing the strength of the resulting sheet and increasing perceived softness. Such chemical debonders include quaternary ammonium compounds, mixtures of quaternary ammonium compounds with polyhydroxy compounds, and modified polysiloxanes. Examples of quaternary ammonium compounds suitable for use in the present invention include dialkyldimethylammonium salts such as ditallow dimethyl ammonium chloride, ditallow dimethylammonium methyl sulfate, and di(hydrogenated)tallow dimethyl ammonium chloride. Particularly suitable debonders are 1-methyl-2 noroleyl-3 oleyl amidoethyl imidazolinium methyl sulfate and 1-ethyl-2 noroleyl-3 oleyl amidoethyl imidazolinium ethylsulfate. Suitable commercially chemical debonders include, without limitation, Witco Varisoft 6027 and Hercules Prosoft TQ 1003. The debonder(s) can be applied to the fibers prior to forming the sheet or after sheet formation and prior to final drying.

The amount of chemical debonder(s) added to or present in the air-side layer can be about 0.02 dry weight percent of the air-side fiber furnish or greater, more specifically from about 0.05 to about 0.5 dry weight percent, more specifically from about 0.05 to about 0.3 dry weight percent, and still more specifically from about 0.1 to about 0.2 dry weight percent.

The basis weight of each ply of the tissue product can be from about 4 pounds to about 40 pounds per 2880 square feet. The relative basis weights and fiber composition of each layer can vary widely depending upon the number of layers, the number of plies and the desired properties of the tissue product. For a two-ply facial tissue, a suitable basis weight split can be about 40 weight percent of the fibers in the dryer layer, about 25 weight percent of the fibers in the center layer, and about 35 weight percent of the fibers in the air side layer.

The total number of plies in the tissue product can be two, three, four or more. While it is convenient from a manufacturing standpoint to have all of the plies be the same, for purposes of this invention the structure and/or the composition of the various plies within the product can be the same or different. For example, the two outer plies can be layered and have three layers, while the inner ply or plies can be blended (non-layered). Alternatively, the inner ply or plies can also be layered, but have a different layer structure in terms of the total number of layers and/or the layer fiber/chemical composition than the two outer plies. A particularly suitable product configuration is a two-ply product with each ply having three layers.

Suitable fibers for the dryer-side layer include hardwood fibers, such as eucalyptus fibers, as well as softwood fibers. More specifically, the dryer-side layer can advantageously comprise from about 60 to about 100 percent hardwood fibers.

Suitable fibers for the inner strength layer also include hardwood and softwood fibers. More specifically, the inner strength layer can advantageously comprise from about 50 to about 100 percent softwood fibers.

Suitable fibers for the air-side layer include also include hardwood and softwood fibers. More specifically, the air-side layer can advantageously comprise from about 60 to about 100 percent hardwood fibers, more specifically from about 80 to about 100 percent hardwood fibers, and still more specifically from about 90 to about 100 percent hardwood fibers.

Methods for making the tissue products of this invention include any layered forming papermaking process in which the layered paper sheet is creped. Such papermaking processes include conventional wet-pressing processes and throughdrying processes. Suitable examples of such processes are described in the following U.S. patents, which are hereby incorporated by reference: U.S. Pat. No. 5,494,554, entitled "Method for Making Soft Layered Tissues" issued Feb. 27, 1996 to Edwards, et al.; U.S. Pat. No. 5,730,839, entitled "Method of Creping Tissue Webs Containing a Softener Using a Closed Creping Pocket" issued Mar. 24, 1998 to Wendt, et al.; U.S. Pat. No. 3,994,771, entitled "Process for Forming a Layered Paper Web Having Improved Bulk, Tactile Impression and Absorbency and Paper Thereof" issued Nov. 30, 1976 to Morgan, Jr. et al.

EXAMPLES

In order to further illustrate the products of this invention, tissues were produced in accordance with this invention and in accordance with prior art methods (control).

Example 1 (Invention)

A tissue made in accordance with this invention was produced as follows. Eucalyptus fibers were pulped for thirty minutes, diluted to 4.5 percent consistency and transferred to the short fiber stock system. Broke fibers from the tissue machine and converting operations were pulped until they were nit free and then transferred to the broke system. The broke fiber was used as a sweetener stock for the machine saveall and transferred to the saveall chest. Stock from the saveall chest was then blended with eucalyptus fiber from the short fiber system. The blended fiber was 66 percent virgin eucalyptus and 34 percent broke. After blending, the fiber was transferred to the tissue machine dryer-side layer machine chest and the air-side layer machine chest.

Northern softwood kraft fibers were pulped for forty minutes, diluted to 4.5 percent consistency and transferred to the long fiber system. The fibers were refined with an energy input of 3.55 horsepower-days per ton of dry fiber and transferred to the inner (center) layer machine chest.

Fiber in all three machine chests was treated with Hercules Kymene 6500 wet strength resin at a rate of about 1.6 pounds of active chemical per metric ton of dry fiber on a total sheet basis. The long fiber in the center layer machine chest was treated with Hercules Hercobond 1366 at a level sufficient to meet sheet tensile targets (about 4 pounds per metric ton of dry fiber). The blend of broke and eucalyptus fiber in the air-side machine chest was treated with Hercules Prosoft TQ 1003 debonder at a rate of 0.1 percent (2.1 pounds of active chemical per metric ton of oven dry fiber). The overall layered sheet fiber weight split was 40 weight percent in the dryer-side layer, 26.2 weight percent in the center layer, and 33.8 weight percent in the air-side layer.

A three layer crescent former headbox was used to form the sheet. Turbulence-generating inserts recessed about 7 inches from the slice and layer dividers extending about 3 inches beyond the slice were employed. The net slice opening was about 0.5 inch. The calculated headbox flow was 123 gallons per minute per inch of headbox width.

The dryer speed was 4500 feet per minute (fpm). The dryer pressure was controlled to 76 pounds per square inch (psi). A two-section gas-fired hood aided in drying the sheet. The dryer hood temperatures were varied as needed to achieve a sheet dryness during creping of about 99 percent. A creping adhesive of Hercules Kymene 6500 and polyvinyl alcohol was used to aid sheet adhesion and dryer protection. A release agent, Quaker 2008M, was used to aid in sheet release. The dry sheet was creped from the dryer and wound into a parent roll at a crepe ratio of 1.25.

A two-ply sheet for conversion into finished product was produced by taking two parent rolls and unwinding, pressing, crimping for ply attachment, slitting, and winding the two-ply sheet with the dryer-side layers facing outwardly (towards the consumers). The pressing level was 70 pounds per lineal inch (pli). The total winder draw was 6 percent. The winder wind up speed was 2500 fpm.

Example 2 (Control)

A control tissue with the debonder added to the dryer-side layer was produced as follows. Eucalyptus fibers were pulped for thirty minutes, diluted to 4.5 percent consistency and transferred to the short fiber system. The eucalyptus fibers were then transferred to the dryer-side layer machine chest.

Broke fibers from the tissue machine and converting operations were pulped until they were nit free and then transferred to the broke system. The broke fibers were then used as sweetened stock for the saveall and transferred to the saveall chest.

A blend of northern softwood kraft (NSWK) fibers and eucalyptus fibers were pulped for forty minutes, diluted to 4.5 percent consistency and transferred to the long fiber system. The fiber blend was 66 dry weight percent NSWK and 34 dry weight percent eucalyptus. This blend was refined with an energy input of 2.1 horsepower-days per ton of dry fiber. The refined fiber was blended with stock from the saveall chest and transferred to the center layer and air-side layer machine chests. The resulting blend in the center layer and air-side layer machine chests was 42 percent broke and 58 percent refined fiber.

The fibers in all three machine chests were treated with Hercules Kymene 6500 wet strength resin at a rate of around 1.6 pounds of active chemical per metric ton of dry fiber on a total sheet basis. The fibers in the center layer and the air-side layer machine chests were treated with Hercules Hercobond 1366 at a level sufficient to meet sheet tensile targets (around 2.2 pounds of active chemical per metric ton of dry fiber.) The eucalyptus fiber in the dryer-side layer machine chest was treated with Hercules Prosoft TQ1003 debonder at a level of 0.1 weight percent (2.1 pounds of active chemical per metric ton of dry fiber) based on the oven dry weight of fiber in this layer. The overall layered sheet weight split was 40 dry weight percent of the fibers in the dryer-side layer, 30 dry weight percent of the fibers in the center layer, and 30 dry weight percent of the fibers in the air-side layer.

The same three layer crescent former headbox used above was used to form the control sheet, including the same turbulence generating inserts, layer dividers, and slice opening. The calculated headbox flow rate was 125 gallons per minute per inch.

The dryer speed was 4500 fpm. The dryer pressure was 75 psi. Hood temperatures were varied as needed to achieve a sheet dryness of about 99 percent during creping. The creping adhesive and release agent were the same as described above. The dry sheet was creped from the dryer and wound into a parent roll at a crepe ratio of 1.25.

A two-ply sheet for conversion into finished product was produced by taking sheets from two parent rolls and unwinding, pressing, crimping for ply attachment, slitting, and winding them up with the dryer-side layers facing outwardly (towards the consumers). The pressing level was 98 pli. The total winder draw was 6.9 percent. The winder wind up speed was 2660 fpm.

Examples 1 and 2 Properties Comparison

The rewound rolls produced in accordance with this invention and the control rolls were converted into finished two-ply facial tissue products. The finished products had the following physical properties set forth in Table 1 below.

TABLE 1

|  | Invention | Control |
| --- | --- | --- |
| Basis weight (gsm) | 27.9 | 27.4 |
| Caliper (micrometers) | 208 | 206 |
| Geometric mean tensile (g) | 578 | 590 |
| Geometric mean modulus (kg) | 8.08 | 7.86 |
| Machine direction stretch (%) | 17.3 | 18.9 |
| Cross-machine direction stretch (%) | 5.3 | 4.4 |
| Slough (mg) | 5.22 | 7.16 |
| Slough standard deviation (mg) | 0.69 | 0.82 |

Slough was measured by a test intended to determine the relative tendency of different tissues to create slough in use when rubbed or handled. More specifically, the test measures their abrasion resistance when subjected to a horizontally reciprocating surface abrading spindle. The equipment and method used is similar to that described in U.S. Pat. No. 4,326,000, herein incorporated by reference. All samples were conditioned at 23° C.±1° C. and 50%±2% relative humidity for a minimum of 4 hours prior to testing.

The abrading spindle consists of a stainless steel rod, 0.5 inch in diameter, with the abrasive portion consisting of a 0.005 inch deep diamond pattern knurl extending 4.25 inches in length around the entire circumference of the rod. The spindle is mounted perpendicularly to the face of the instrument such that the abrasive portion of the rod extends out its entire distance from the face of the instrument. On each side of the spindle are two metal sidewalls, spaced 4 inches apart and centered about the spindle, that support the span of the sample being tested. The top of each sidewall is smooth. The spindle is mounted such that its upper surface is about 0.375 inch above the upper surface of each of the tops of the sidewalls, such that when the sample to be tested is in place, the sample is draped under tension over the top of each sidewall while contacting the spindle positioned in between the sidewalls. On the outside of each of the sidewalls is a sample clamp, one of which is fixed against the outside of the sidewall and the other being moveable up and down along the outside of the sidewall. The movable clamp (approximately 102.7 grams) is allowed to slide freely in the vertical direction on the outside of one wall, the weight of the clamp providing the means for insuring a constant tension of the sample over the spindle surface and the supporting sidewalls.

Using a precision cutter, the tissue specimens are cut into strips 3 inches wide by 7 inches long. The length is not critical as long as the test specimen can span the distance so as to be inserted into the jaws of the clamps. The machine direction of the tissue corresponds to the longer sample dimension. Each test strip is weighed to the nearest 0.1 mg. One end of the tissue is secured by the fixed clamp, the sample then loosely draped over the spindle and clamped into the jaws of the movable clamp. The entire width of the tissue should be in contact with the abrading spindle. The movable clamp is then allowed to fall providing constant tension across the spindle.

The spindle is then moved back and forth at an approximate 15 degree angle from the centered vertical centerline in a reciprocal horizontal motion against the test strip for 20 cycles (each cycle is a back and forth stroke), at a speed of 170 cycles per minute, removing loose fibers from the web surface. Additionally the spindle rotates counter clockwise (when looking at the front of the instrument) at an approximate speed of 5 rounds per minute. The sample is then removed from the jaws and any loose fibers on the sample surface are removed by gently shaking the sample test strip. The test sample is then weighed to the nearest 0.1 mg and the weight loss calculated. Ten test strips per sample are tested and the average weight loss value (mg) is the amount of slough.

Lint and softness parameters for the samples were determined using a trained sensory profile panel (SPP). The SPP provides a detailed description of the product using textile industry attributes. Controlled test standards are used to aid in product evaluations. Highly trained panelists are employed for this testing. Generally, if the SPP cannot discriminate differences between products, the consumer public at large cannot either.

The SPP panelists evaluated the tissue samples for the following parameters: "lint", "fuzzy", "gritty" and "stiffness". The latter three parameters are characteristics of tissue softness. "Lint" is the amount of dust or small fibers visible in the air when the tissue is manipulated. Lower scores are better. "Fuzzy" is the amount of fibers, pile, nap and fuzz on the surface of the tissue. Higher scores are better. "Gritty" is the amount of sharp, prickly, abrasive particles and fibers felt on the surface of the tissue. Lower scores are better. "Stiffness" is the amount of pointed, rigid or cracked edges or peaks felt from the sample when turned in the hand. Lower scores are better. A Softness value was calculated using values for "fuzzy", "gritty" and "stiffness" based on a correlation of the test results with other tissues tested in previous consumer studies. Higher scores are better. The results of the testing are set forth in Table 2 below.

TABLE 2

|  | Invention | Control |
| --- | --- | --- |
| Lint | 11.11 | 11.9 |
| Fuzzy | 7.16 | 7.20 |
| Gritty | 1.33 | 1.56 |
| Stiffness | 3.4 | 3.64 |
| Calculated Softness | 8.21 | 8.06 |

As shown, the tissue of this invention exhibited less lint and was equal to or slightly better than the control tissue on all softness measures.

Another way of evaluating softness is to use an in-hand-ranking panel to rank tissues on their softness and stiffness. The members in this panel are minimally-trained so that the results are generalizable to the consumer population. The Invention and Control tissues were submitted to such a panel and evaluated. The Invention tissue was considered slightly softer and less stiff than the Control tissue.

It will be appreciated that the foregoing description and examples, given for purposes of illustration, are not intended to limit the scope of the invention, which is defined by the following claims and all equivalents thereto.

What is claimed is:

1. A multi-ply tissue product comprising two multi-layered creped outer plies of papermaking fibers, at least one of said multi-layered creped outer plies having three or more layers which include a soft, outwardly-facing dryer-side layer, one or more inner strength layers and a soft, inwardly-facing air-side layer, wherein the soft, outwardly-facing dryer-side layer is substantially free of chemical debonder and wherein the inwardly-facing air-side layer comprises one or more chemical debonders.

2. The tissue product of claim 1 wherein said one or more inner strength layers contain one or more chemical strength agents.

3. The tissue product of claim 1 wherein the amount of chemical debonder in the inwardly-facing air-side layer is about 0.02 weight percent or greater.

4. The tissue product of claim 1 wherein the amount of chemical debonder in the inwardly-facing air-side layer is from about 0.05 to about 0.5 weight percent.

5. The tissue product of claim 1 wherein the amount of chemical debonder in the inwardly-facing air-side layer is from about 0.05 to about 0.35 weight percent.

6. The tissue product of claim 1 wherein the amount of chemical debonder in the inwardly-facing air-side layer is from about 0.01 to about 0.2 weight percent.

7. The tissue product of claim 1 wherein the chemical debonder is selected from the group consisting of quaternary ammonium compounds, mixtures of quaternary ammonium compounds with polyhydroxy compounds, and modified polysiloxanes.

8. The tissue product of claim 1 wherein the chemical debonder is 1-ethyl-2 noroleyl-3 oleyl amidoethyl imidazolinium ethylsulfate.

9. The tissue product of claim 1 wherein the fiber content of the air-side layer is from about 60 to about 100 weight percent eucalyptus fibers.

10. The tissue product of claim 1 having only two plies.

11. The tissue product of claim 1 wherein each outer ply has three layers.

12. The tissue product of claim 1 wherein each outer ply has four layers.

13. The tissue product of claim 1 wherein each outer ply has five layers.

14. A multi-ply tissue product comprising two multi-layered creped outer plies of papermaking fibers, each of said multi-layered creped outer plies having three layers consisting of a soft, outwardly-facing dryer-side layer, an inner strength layer and a soft, inwardly-facing air-side layer, wherein the inwardly-facing air-side layer comprises one or more chemical debonders and wherein the soft, outwardly-facing dryer-side layer is substantially free of chemical debonder.

15. A multi-ply tissue product comprising two multi-layered creped outer plies of papermaking fibers, each of said multi-layered creped outer plies having four or more layers which include a soft, outwardly-facing dryer-side layer, one or more inner strength layers and one or more inner air-side softness layers, wherein the inner air-side softness layer(s) contain one or more chemical debonders and wherein the soft, outwardly-facing dryer-side layer is substantially free of chemical debonder.

16. The tissue product of claim 15 wherein the outer plies have four layers.

17. The tissue product of claim 16 containing a soft, outwardly-facing dryer-side layer, an inner strength layer, an inner air-side softness layer and an air-side layer, wherein the air-side layer contains no chemical debonder and has a lower basis weight than the inner air-side softness layer.

* * * * *